United States Patent [19]
Lenseigne

[11] 3,855,559
[45] Dec. 17, 1974

[54] MAGNETIC POSITION DETECTORS, NOTABLY LEVEL DETECTORS

[75] Inventor: Jean Paul Lenseigne, Enghien-les-Bains, France

[73] Assignee: Societe Anonyme Petrole Service, Paris, France

[22] Filed: Dec. 3, 1973

[21] Appl. No.: 420,934

[30] Foreign Application Priority Data
Dec. 5, 1972  France .............................. 72.43172

[52] U.S. Cl. ............................. 335/207, 200/84 C
[51] Int. Cl. ............................................. H01h 36/00
[58] Field of Search ............................. 335/205–207, 200/84 C

[56] References Cited
UNITED STATES PATENTS
| 3,145,277 | 8/1964 | Senn .................................. 200/84 C |
| 3,167,694 | 1/1965 | Bekedam .......................... 335/206 |
| 3,505,869 | 4/1970 | Crawford ......................... 335/206 X |

Primary Examiner—R. N. Envall, Jr.

[57] ABSTRACT

A magnetic detection device for detecting the position of a movable member of the type comprising a piece of magnetic material associated with the movement of the movable member and capable of moving within a tube of non-magnetic material, and at least one detector unit disposed in a fixed manner with respect to the tube and externally thereof, and formed of a permanent magnet the poles of which are directed towards the tube, and a a flexible knife switch fixed immediately adjacent to the magnet.

According to the invention, the tube is surrounded with a ring of magnetic material integral with the two poles of the magnet, so that it is possible to use a permanent magnet which is much less powerful than the magnets of known devices while obtaining a variation in intensity of at least 50 percent of the intensity of the magnetic field in the flexible knife switch when the part made of magnetic material arrives at the level of the ring or moves away from it.

11 Claims, 5 Drawing Figures

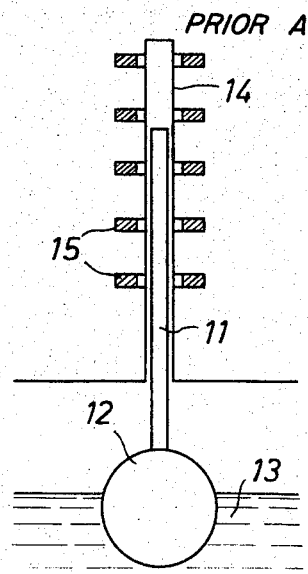
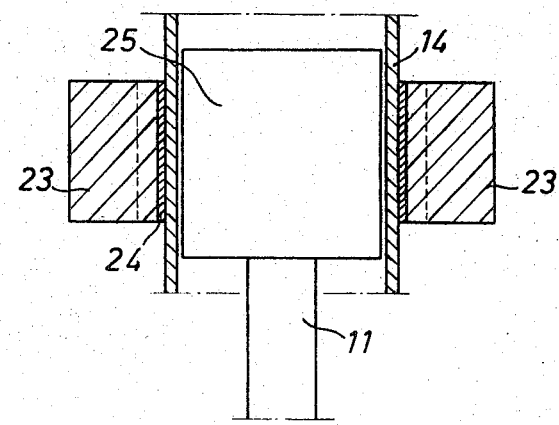
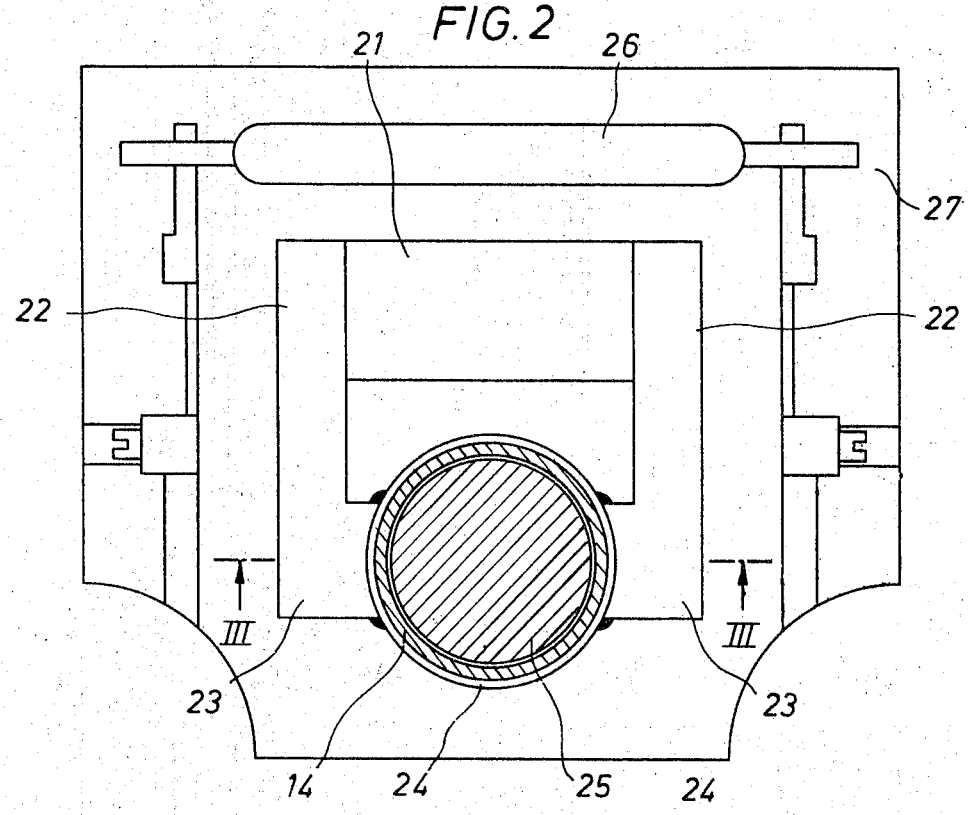

MAGNETIC POSITION DETECTORS, NOTABLY LEVEL DETECTORS

The present invention relates to magnetic position detectors, notably level detectors.

Level detectors are already known in which a piece of magnetic material moves vertically to the surface of a liquid to be measured and is thus caused to cross a magnetic field, said crossing bringing about a modification of the electric field inducing the activation of a switch, or a relay for instance, or the display of the information required, or the control of any suitable apparatus.

In a known method for the realization of such devices, the piece of magnetic material is carried on a rod integral with a float and capable of moving within a tube made of nonmagnetic material. At a certain level, or at several successive levels along the tube, and externally thereof, a magnetic source is disposed, consisting preferably of a permanent magnet, and a magnetic contactor advantageously consisting of a flexible knife switch disposed in a fixed manner with respect to the magnetic source and immediatly adjacent thereof. When the piece of magnetic material arrives at the level of the magnet of one of the detector devices, the modification of the form and the variation in the intensity of the magnetic field existing immediately adjacent to the magnet are modified and this induces a change of state of the flexible knife switch. Practice has shown that this type of device has serious drawbacks resulting in uncertain precision and efficiency.

In order for the flexible knife switch to operate in the required manner it is necessary to have a variation in intensity of at least 50 percent of the magnetic field at the level of the flexible knives of the switch, and this imposes certain size requirements both for the permanent magnet of the device and the magnetic part moving in the non-magnetic tube. As a result of this the magnet is so powerful that the magnetic part often has difficulty in moving freely in the non-magnetic tube owing to the relatively strong pull which develops in the part when it reaches the level of the magnet.

The essential object of the present invention is to do away with these drawbacks and to devise a magnetic detection device of the above type but arranged in such a manner that the magnetic force brought into play is notably reduced while obtaining the necessary 50 percent variation in intensity of the magnetic field necessary at the level of the flexible knife switch to activate it.

With this end in view, the object of the invention is a magnetic device for detecting the position of a movable member of the type comprising a part made of magnetic material associated with the movement of the movable member which is capable of moving within a tube of non-magnetic material and at least one detection unit disposed in a fixed manner with respect to the tube and exterior thereof and forming a permanent magnet the poles of which are directed towards the tube and a flexible knife switch secured immediatly adjacent to the magnet, characterized in that, at the level of each of the detector units, the tube is surrounded with a ring of magnetic material rigidly secured to both poles of the magnet.

With a device arranged in this way it is found to be possible to use a permanent magnet which is much less powerful than the magnets of known devices while obtaining a variation in intensity of at least 50 percent of the intensity of the magnetic field in the flexible knife switch when the part made of magnetic material arrives at the level of the ring or moves away from it. This results in a notable decrease in the friction forces liable to hinder free sliding of the part within the non-magnetic tube.

Furthermore, in such a device, the magnet is preferably in the form of a U the two ends of which comprise a prolongation positioned diametrically to the tube welded to the said ring, the flexible knife switch being fixed against the magnet parallel to the horizontal bar of the U.

It was, in fact, found that the greatest variation in the intensity of the magnetic field was observed with this particular position of the flexible knife switch when the part made of magnetic material reached the level of the pole pieces of the magnet.

The ring advantageously comprises two longitudinal slits set opposite to each other and positioned in a plane containing the axis of the ring and substantially perpendicular to the axis connecting the ends of both magnetic poles of said permanent magnet. Such an arrangement will further improve the sensitivity and efficiency of the device.

Other characteristics and advantages will be brought out from the description which follows of a preferred mode of embodiment of devices of the invention, this description being given purely by way of example and with reference to the accompanying drawings in which:

FIG. 1 is a diagramatic view of a known device for determining the level of a liquid by the detection of the movements of a rod integral with a float.

FIG. 2 is a cross-sectional view from above of the device of FIG. 1 comprising improvements and according to the present invention.

FIG. 3 is a partial, vertical cross-sectional view along line III—III of the device of FIG. 2.

Figure 4:
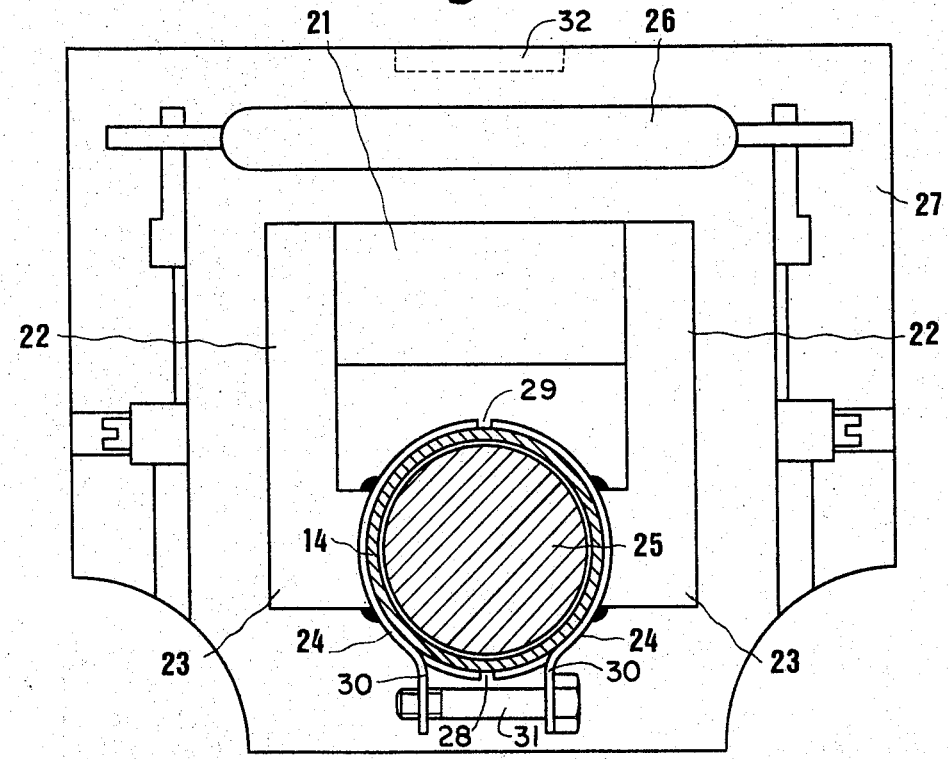
FIG. 4 is a top plane view of a variant of the device of FIG. 2.

FIG. 1 represents a device of known structure comprising a rod 11 integral with a float 12 supported by a liquid 13 to be monitored. At the end, or at any point along its length, rod 11 comprises a magnetic core (not shown) and is able to move within a tube 14 composed of a non-magnetic material. Detection units 15, which are all identical, are positioned at various heights along said tube.

One of the detector units according to the present invention is shown diagrammatically in FIGS. 2 and 3. Said unit comprises a magnetic circuit consisting of a permanent magnet 21 at each end of which is secured a pole piece 22 whereby the magnetic circuit forms a U. The extremities of the pole pieces 22 comprise prolongements 23 disposed diametrically to tube 14 in the direction of the latter. At the level of pole pieces 22 tube 14 is surrounded with a ring 24, of soft steel for instance, welded to the extremities of prolongations 23 of the pole pieces. A cylindrical piece 25 made of magnetic material and integral with rod 11 moves within tube 14. Piece 25 has a diameter slightly smaller than the inner diameter of tube 14.

Immediately adjacent to the magnet 21, and parallel thereto, there is secured a flexible knife switch 26 suitably connected to an external control or indicator circuit (not shown). In the mode of realization shown in FIG. 1, switch 26 and its subsidiary connections are sealed in a block of resin 27 integral with the magnetic circuit of the device.

In such a device it is observed that the presence of the magnetic cross-linking formed by the ring 24 makes it possible to use a magnet 21 having a notably lower power than that of the magnets of known detector devices, while having a variation in intensity of the magnetic field of at least 50 percent at the level of the flexible blades of switch 26 when the core 25 arrives at the level of prolongations 23 of the pole pieces, thus permitting effective and reliable operation of switch 26.

Furthermore, the presence of ring 24 makes it possible to considerably limit the pull to which core 25 is subjected when it moves at right angles with the pole pieces and, subsequently, the friction forces likely to hinder the free sliding of core 25 in tube 14. This accordingly increases the reliability of the device according to the present invention.

Figure 5:
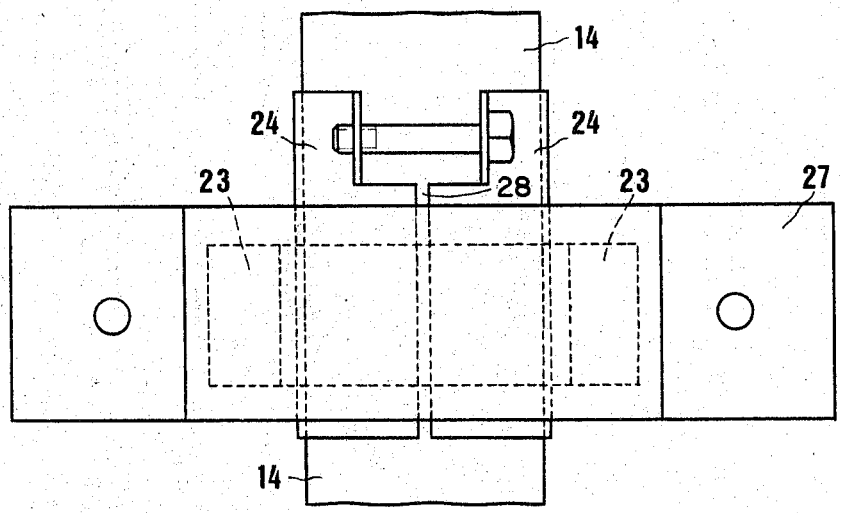
FIG. 5 is an elevational view of the device of FIG. 4.

FIGS. 4 & 5 show a variant of embodiment intended to still further improve the performances of the device by providing in ring 24 at least one longitudinal slot forming a solution of continuity in the metal magnetic flux conduit circuit formed by ring 24.

In the preferred form of embodiment of FIGS. 4 and 5 ring 24 comprises two identical slots 28 and 29 situated in a plane containing the axis of ring 24 and substantially perpendicular to the axis connecting the two prolongations 23. Such an arrangement was observed to considerably increase the variations in the magnetic field adjacent the flexible knife switch 26 when piece 25 moves opposite ring 24. The sensitivity and efficiency of the device is thus considerably improved without increasing the strength of the permanent magnet, that is to say without increasing the friction between piece 25 and tube 14 resulting from the pull. Advantageously, the upper portion (FIG. 5) of ring 24 is prolonged outside the block of resin 27 and, after cutting the edges of slot 28 are separated to form two parallel tabs 30 in which holes are formed to receive a screw 31 for tightening ring 24, that is to say the whole device, on tube 14, like a collar.

It should be noted that the other slot (29) could comprise a flexible fixing arrangement for the device identical to that of slot 28.

In the device shown in FIGS. 4 and 5, operation can result in closing or, on the contrary, opening the circuit of switch 26 when a small permanent magnet 32 is secured parallel to switch 26, at a short distance therefrom, said auxilliary magnet 32 being intended to annul or sufficiently oppose the effect of the principal magnet 21, that is to say to maintain switch 26 open normally, when piece 25 is not on a level with ring 24. Such an auxilliary magnet 32 can, moreover, be provided whether ring 24 comprises slots or not, that is to say with a device according to FIGS. 2 and 3.

Finally, the invention is not limited to the form of embodiment shown and described hereinabove but covers all the variants.

I claim:

1. A magnetic detection device for detecting the position of a movable member comprising a nonmagnetic tube, a piece of magnetic material operatively connected to said member and movable within said tube in accordance with the movement of said member, a detector unit situated external to said tube comprising a permanent magnet the poles of which are situated on either side of said tube and a ring of magnetic material surrounding said tube and integral with the poles of said magnet, and a flexible knife switch located adjacent said magnet.

2. The device of claim 1 wherein said magnet has a substantially U-shape and wherein said ring is mounted to the extremities thereof.

3. The device of claim 2 wherein said knife switch is secured adjacent said magnet parallel to the bar portion thereof.

4. The device of claim 1 wherein said ring has a longitudinal slot therein.

5. The device of claim 1 wherein said ring has two opposed slots situated in the plane containing the axis of the ring and substantially perpendicular to the axis joining the extremities of the two magnetic poles of said permanent magnet.

6. The device of claim 4 further comprising a pair of tabs each of which is mounted to a different one of the edges of said slot and means for connecting said tabs together to secure said ring to said tube.

7. The device of claim 5 further comprising a pair of tabs each of which is mounted to a different one of the edges of one of said slots and means for connecting said tabs together to secure said ring to said tube.

8. The device of claim 1 wherein said piece of magnetic material comprises ferro-magnetic material.

9. The device of claim 1 wherein said ring is made of a soft steel.

10. The device of claim 1 further comprising an auxiliary permanent magnet secured parallel to said switch and adjacent thereto in order to annul or oppose the effect of said permanent magnet.

11. The device of claim 1 further comprising a liquid whose level is to be monitored, said movable member being adopted to float on the surface of said liquid and a nonmagnetic rod connected between said movable member and said piece of magnetic material.

* * * * *